(12) United States Patent
Cooke

(10) Patent No.: US 7,310,962 B2
(45) Date of Patent: Dec. 25, 2007

(54) EVAPORATIVE COOLERS (76) Inventor: Roger Laurence Cooke, 392 St. Kilda Street, Brighton, Victoria (AU) 3186

( * ) Notice: Subject to any disclaimer, the term of this patent is extended or adjusted under 35 U.S.C. 154(b) by 192 days.

(21) Appl. No.: 10/510,006

(22) PCT Filed: Mar. 28, 2003

(86) PCT No.: PCT/AU03/00387

§ 371 (c)(1),
(2), (4) Date: Aug. 9, 2005

(87) PCT Pub. No.: WO03/085328

PCT Pub. Date: Oct. 16, 2003

(65) Prior Publication Data

US 2006/0191278 A1    Aug. 31, 2006

(30) Foreign Application Priority Data

Apr. 4, 2002    (AU) .......................................... 1529

(51) Int. Cl.
F25D 23/12    (2006.01)

(52) U.S. Cl. ..................................... 62/259.4

(58) Field of Classification Search ............... 62/259.4, 62/310, 314, DIG. 16, 259.1, 263, 309, 244
See application file for complete search history.

(56) References Cited

U.S. PATENT DOCUMENTS

| | | | | |
|---|---|---|---|---|
| 2,784,568 A | * | 3/1957 | Schjolin | 62/323.1 |
| 3,738,621 A | * | 6/1973 | Anderson | 261/29 |
| 3,953,551 A | * | 4/1976 | Dorall | 261/91 |
| 4,181,690 A | | 1/1980 | Neu | 261/29 |
| 5,454,538 A | * | 10/1995 | Merideth | 248/237 |

FOREIGN PATENT DOCUMENTS

| | | |
|---|---|---|
| AU | A-17893/95 | 11/1995 |
| WO | WO 98/40678 | 9/1998 |

* cited by examiner

Primary Examiner—Melvin Jones
(74) Attorney, Agent, or Firm—Seed Intellectual Property Law Group PLLC (57) ABSTRACT An evaporative cooler has a housing mounted within the roof space of a pitched roof with the housing inlet, which mounts evaporative cooling pads, lying at or adjacent to the plane of the roof. This construction avoids the unsightly protrusion normally associated with roof-mounted evaporative coolers.

31 Claims, 6 Drawing Sheets

EVAPORATIVE COOLERS

The present invention relates to an evaporative cooler and more particularly to an evaporative cooler for use in a ducted cooling system.

Conventionally, an evaporative cooler for use in a ducted cooling system comprises a large box-like housing installed on the roof of a building and includes an outlet for cooled air which extends through the roof for connection to ducting installed within the roof space for distribution of the cooled air to selected parts of the interior of the building. The housing contains evaporative pads through which external air is drawn by a fan mounted within the housing, for discharge through the outlet and ducting connected thereto. Evaporative pads of relatively large area are needed to obtain the required volume of cooled air and as a result, the overall housing of the cooler is relatively large. Accordingly, the installation of an evaporative cooler particularly on the pitched roof of a domestic dwelling where, typically, the housing has a significant projection over the roof line, can be very unsightly. Moreover, a fan of high capacity is required to generate the requisite air flow and this can result in substantial noise generation externally of the housing particularly when the cooler is operating close to its maximum capacity. This noise generation can be quite troublesome in an urban situation and can result in nuisance to near neighbours.

According to the present invention there is provided an evaporative cooler having a housing adapted to be installed within the roof space of a pitched roof, said housing having an air inlet associated with one or more evaporative pads defining an air-permeable cooling means, means for supplying water to the or each pad, and a fan for drawing external air into the housing via the air-permeable cooling means and for discharging the air thereby cooled via an outlet, wherein the housing is so configured that the air-permeable cooling means is closely adjacent the external surface of the pitched roof.

Further according to the invention, there is provided an evaporative cooler having a housing adapted to be installed within the roof space of a pitched roof, said housing having an air inlet associated with one or more evaporative pads defining an air-permeable cooling means, means for supplying water to the or each pad, and a fan for drawing external air into the housing via the air-permeable cooling means and for discharging the air thereby cooled via an outlet, wherein the housing is so configured that when the unit is installed there is no substantial projection of the air-permeable cooling means beyond the external surface of the pitched roof.

Still further according to the invention, there is provided an evaporative cooler having a housing adapted for installation substantially within the roof space of a pitched roof, said housing having an inlet adapted to lie at or adjacent to the plane of the roof, one or more evaporative pads mounted to the inlet, the or each pad defining an air-permeable cooling means, means for supplying water to the or each pad, and a fan for drawing external air into the housing via the air-permeable cooling means and for discharging the air thereby cooled via an outlet.

Still further according to the invention, there is provided an evaporative cooler installation mounted within the roof space of a pitched roof of a building, said installation including an evaporative cooler having a cooler housing mounted between rafters of the pitched roof, said housing being substantially wholly within the roof space and carrying a fan for drawing external air into the housing via one or more evaporative pads defining an air-permeable cooling means and for discharging the air thereby cooled via an outlet from the housing, and said housing also carrying a water reservoir and a pump for feeing water from the reservoir to the or each pad and forming means for supplying water to the or each pad, whereby said fan, water reservoir, and pump are also within the roof space, wherein the housing mounts the air-permeable cooling means adjacent the external surface of the pitched roof.

Still further according to the invention, there is provided an evaporative cooler installation mounted within the roof space of a pitched roof of a building, said installation including an evaporative cooler having a cooler housing mounted between rafters of the pitched roof, said housing being substantially wholly within the roof space and carrying a fan for drawing external air into the housing via one or more evaporative pads defining an air-permeable cooling means and for discharging the air thereby cooled via an outlet from the housing, and said housing also carrying a water reservoir and a pump for feeding water from the reservoir to the or each pad and forming means for supplying water to the or each pad, wherein the housing mounts the air-permeable cooling means such that there is no substantial unsightly projection of the air-permeable cooling means beyond the external surface of the roof.

In one form the air-permeable cooling means is substantially planar and may be arranged to lie parallel to the plane of the roof or flush with the roof; alternatively it may be inclined through a small angle to the plane of the roof and/or project slightly from the plane of the roof while still avoiding unsightly protrusion.

Water can be applied to the or each evaporative pad of the planar air-permeable cooling means by spraying or drip feeding water onto the external surface of the pad. The base of the housing defines or contains a reservoir for supply of water to the pads and also to receive water draining from the pads and to direct this to the reservoir. As such, the reservoir will also catch any rain water penetrating the pads when the cooler is not in use. In practice, a high level overflow pipe will be incorporated to discharge excess water from the reservoir.

In an alternative form the evaporative pads forming the air-permeable cooling means may be arranged in an angular array one inclined relative to another while still lying close to the plane of the roof to avoid significant unsightly protuberance. In this form the pads may be mounted wholly within the inlet portion of the housing to avoid substantially any protrusion above the plane of the roof, the pads having a relatively upright orientation so that water can be fed to troughs at the upper edges of the pads to flow downwardly through the pads in the length direction thereof. In this form also, the base of the housing defines or contains a reservoir for supply of water to the pads and also to receive water draining from the pads and to direct this to the reservoir. Although it is particularly preferred for the pads to be mounted so that there is substantially no protrusion above the plane of the roof, nevertheless a configuration in which the inlet to the housing extends a small distance above the plane of the roof would be feasible as this would still avoid any significant unsightly protrusion.

In practical embodiments of the invention, the housing is of a wedge shape of a width to fit between rafters of the pitched roof and with an inclined upper side which extends substantially in or parallel to the plane of the roof in the longitudinal direction of the rafters, the upper side including or forming the inlet to which the air-permeable cooling means is mounted. To facilitate adaptation of the cooler to suit a wide range of roof pitch angles the upper part of the housing including the air inlet is adjustable in inclination relative to a lower part of the housing, for example by being pivotally mounted thereto or being connected thereto by flexible sheet material.

The embodiments of the invention will now be described by way of example only with reference to the accompanying drawings in which.

Figure 1:
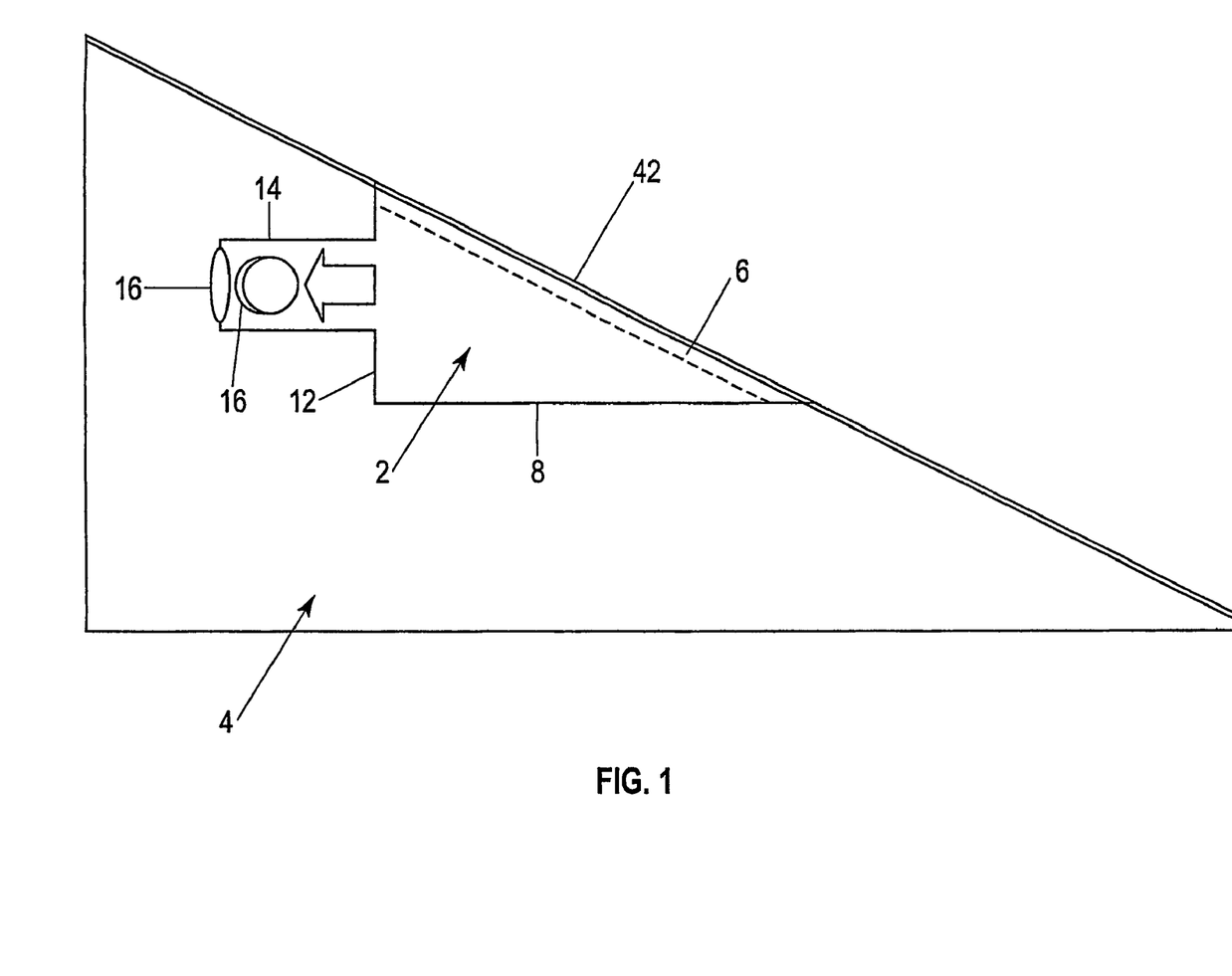
FIG. 1 is a schematic cross section showing an evaporative cooler in accordance with the invention mounted within the roof space of a pitched roof.
Figure 2:
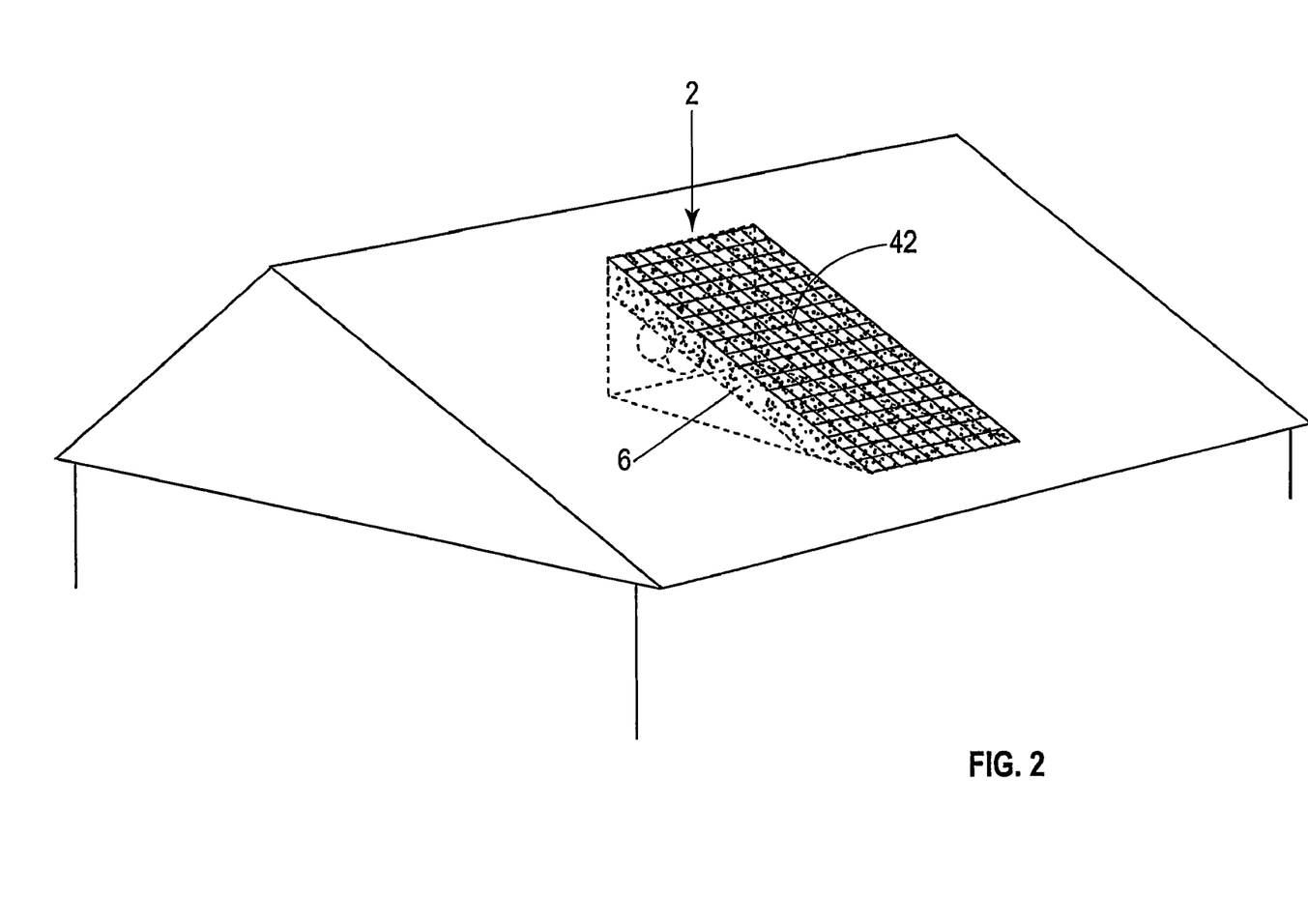
FIG. 2 is shows schematically the installation as viewed from the outside of the roof.
Figure 3:
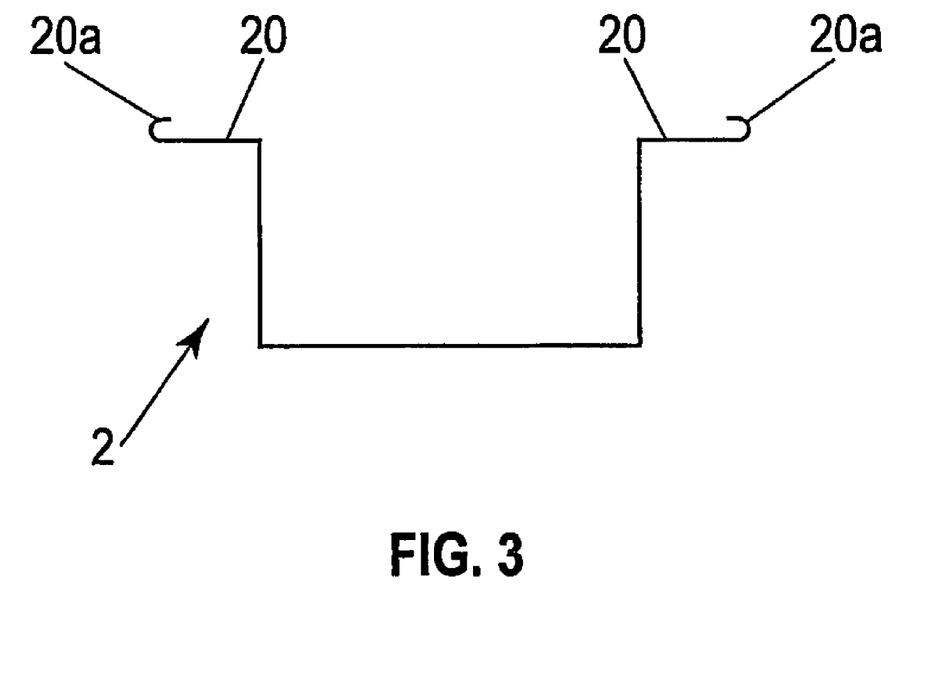
FIG. 3 is a schematic cross section through the housing of the cooler to show integral flashing formed around the outer side of the housing.

With initial reference to FIGS. 1 to 3, an evaporative cooler comprises a main housing 2 adapted for installation within the roof space 4 of a pitched roof, rather than externally of the roof space as is conventional. The housing 2 is of rectangular cross-section of a width such that the housing can fit between two adjacent rafters of the roof structure subject to probable modification of the roof structure to remove part of one or possibly even two intermediate rafters to provide the requisite size. The housing 2 is substantially of wedge-shape overall such that the outer side of the housing which carries the evaporative pads 6 extends along the width of the housing and also along the length of the housing in such a way that it lies substantially within the plane of the pitched roof. Accordingly, the evaporative pads 6 are arranged in a planar array which is also substantially within the plane of the roof or parallel to the plane of the roof in close proximity thereto.

Most domestic dwellings designed in accordance with current building regulations will have rafters at approximately the same spacing and with part of just a single intermediate rafter removed, a housing 2 having a width of approximately 550 mm can be accommodated and this should prove adequate for most installations as will be explained. The housing can be supported directly or indirectly from the rafters. It is to be noted that even in most installations involving conventional coolers externally mounted on the roof, an aperture having a width of similar dimension is required to permit passage of the outlet duct from the cooler into the roof space.

In the particular embodiment shown the wedge-shaped housing 2 has a bottom wall 8 which extends with a slight inclination towards the roof gutter line and a vertical end wall 12 mounting a duct-like extension 14 forming a housing within which a fan is mounted, the fan housing 14 having an inlet communicating with the interior of the main housing 2 and outlets 16 for connection to appropriate ducting within the roof space 4. The main housing 2 also has a system for applying water to the outer surface of the evaporative pads 6. In one form, this can involve the spraying of water onto the pads 6 from jets arranged along at least one longitudinal edge of the planar array of pads 6, or possibly along both longitudinal edges and/or the upper or lower end edges of the pad array. The water may be sprayed from individual spray jets carried by a water manifold extending along one or more of the edges of the outer side of the main housing 2, with the spray jets being so positioned as to ensure adequate water penetration over the entire face of the pad array for maximum cooling effect. The jets may alternatively be formed by slots or holes in the manifold.

Instead of spraying the water onto the pad array, the water may be dripped onto the pad array by drip emitters carried by or formed in the manifold by holes or slots. When a drip system is used several drip manifolds may span across the width or length of the pad array, the pitch spacing of the drip emitters and manifolds being such as to ensure water penetration across the entire face of the pad array. A similar manifold arrangement could be used with spray jets.

The bottom part of the main housing 2 will form or contain a reservoir for water to be fed to the spray or drip system by a suitable pump mounted within the housing. Surplus water from the pads will also drain into the reservoir as will any rain falling on the roof and penetrating the evaporative pads when the cooler is not in use. During operation of the cooler, the reservoir will be filled with water from the mains supply via a suitable float valve. A valve-controlled outlet permits discharge of water from the reservoir as required, with an overflow outlet automatically effecting discharge when the water within the reservoir reaches a predetermined level, for example as may occur during winter months subject to rain fall with the cooler inactive.

Advantageously, the housing 2 is formed with flashing 20 (see FIG. 3) around the perimeter of its outer side. The flashing along the two longitudinal edges and upper edges is designed to sit under the roofing material and the flashing along the lower edge is formed approximately 50 mm higher to sit over the top of the roofing material to allow for rain water run off. Preferably, the housing 2 including the flashing is moulded from a suitable plastic material. As shown in FIG. 3, the flashing is preferably formed with a return edge 20a of U-shape to prevent water penetration by capillary action. Flashing as described and illustrated is in a configuration to suit a tiled roof. Flashing for use with a metal roof will be of a different configuration as will be well understood by those experienced in roofing construction.

Advantageously, one or more of the vertical walls of the housing 2 has inspection panels which are removable to permit access from within the roof space for fill maintenance of the cooler including the sprays or drip emitters as well as internally mounted components such as the fan and pump, and replacement of the pads. The ability to effect full maintenance from within the roof space is of significance as work safety requirements may require the use of safety harnesses and safety rails if work is to be undertaken from the external surface of the roof.

Externally of the evaporative pads 6, the housing 2 may carry a grid structure 42 sufficient to prevent an adult person on the roof accidentally standing on the pads and falling into the housing; it is however to be understood that the design of such a grid structure should ensure that there is no substantial impediment to air flow through the pads from the outside.

Current conventional evaporative coolers for domestic installations tend to have an evaporative pad area of from about 1 m$^2$ for smaller units to 2 m$^2$ for larger units. With the construction proposed herein with a main housing width of approximately 550 mm, an evaporative pad area of approximately 1 m$^2$ can be achieved by a housing in which the length of its inclined outer side is approximately 2 meters and a pad area of 2 m$^2$ can be achieved with a wall of approximately 4 meters; even a length of 4 meters can readily be accommodated within the roof structure of most dwellings.

Figure 4:
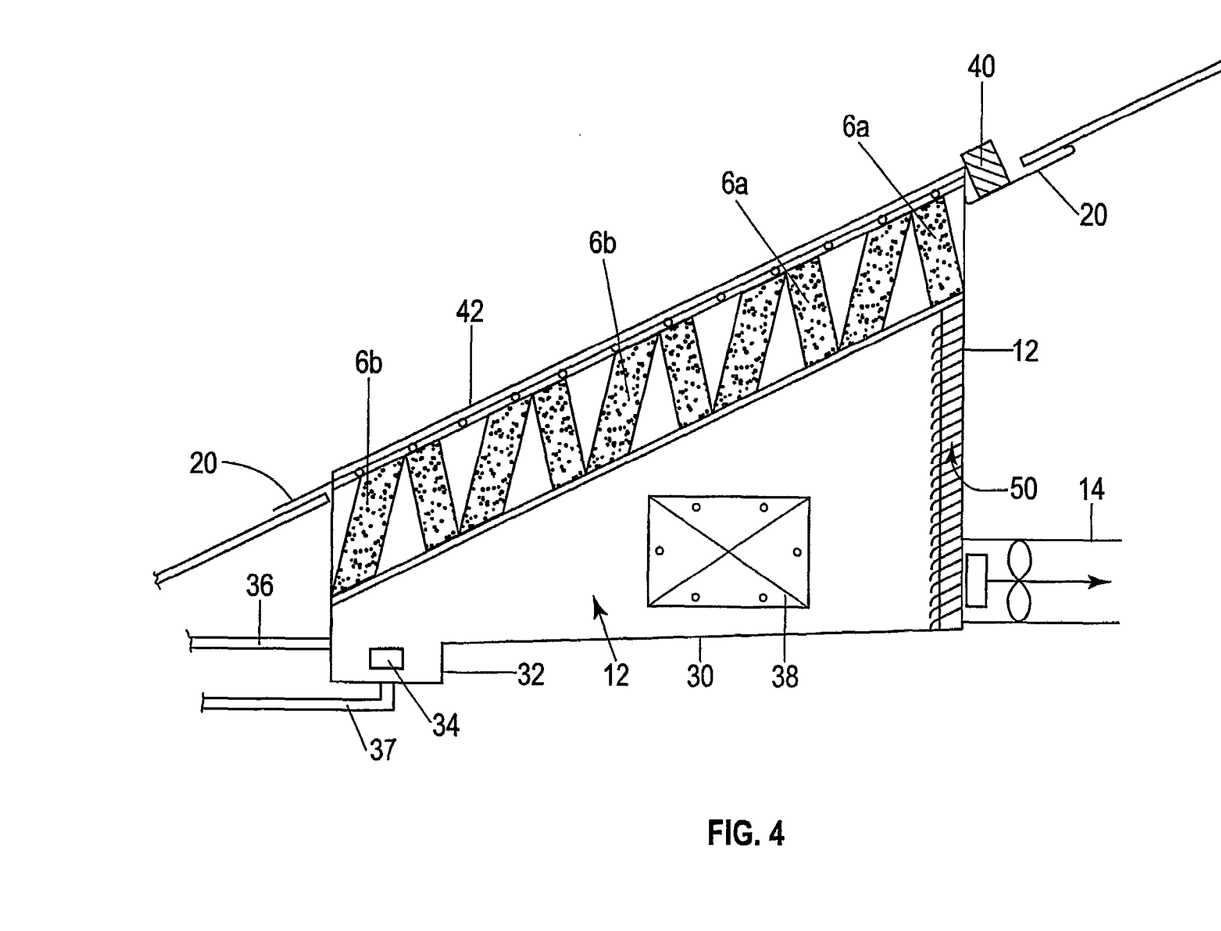
FIGS. 4 to 6 are schematic cross sections showing in greater detail further embodiments of the invention.

FIG. 4 shows in somewhat greater detail an embodiment of the invention in which the bottom wall 30 of the main housing 2 is inclined from back to front and is formed at its front end with a sump 32 into which water drains from within the housing and which also acts as a reservoir for water to be supplied to the evaporative pads. The sump 32 houses a water pump 34 for feeding water to the evaporative pads or alternatively the pump 34 may be mounted externally of the sump 32, with the inlet to the pump 34 leading from the sump 34. Fresh water is fed into the sump 32 via a water feed line controlled by a float valve (not shown) or other level-responsive valve. An overflow outlet 36 and a valve-controlled drain outlet 37 lead from the sump 32. The fan housing 14 leads from the vertical end wall 12 adjacent the bottom wall 30 of the main housing, with the outer end of the fan housing 14 being connected to suitable ducting in conventional manner for distribution of the cooled air within the building. An inspection opening is provided in at least one of the two side walls of the main housing 2 and is accessible after removal of a cover 38 to provide access to the interior of the cooler to facilitate servicing from internally of the roof structure.

Flashing integrally formed with the main housing 2 is shown at 20 and the housing 2 preferably carries a rain water diverter 40 of V-shaped configuration moulded into the upper flashing 20 so that rain water flowing down the roof above the cooler is diverted to flow at either side of the cooler rather than entering the cooler via the open upper side as may otherwise arise with substantial downpours of rain.

A safety grid 42 capable of carrying the weight of an adult person is mounted on the upper side of the housing 2 above the evaporative pads.

As shown in FIG. 4 the evaporative pads (designated 6a, 6b in this figure) are positioned in an angular array in the upper inlet portion of the housing 2 so that each pad has an outer edge adjacent the plane of the roof and an inner edge located further within the interior of the housing 2, with each pad being inclined to the plane of the roof. This configuration permits a substantial increase of pad area for a given length and width of housing in relation to that provided by the planar pad array shown in FIG. 1. It also facilitates water supply and distribution to the pads. Each pad has in this configuration a shorter length and a greater inclination to the vertical so that the pad can be supplied with water fed to a trough or channel extending along the upper edge of the pad with the water flowing downwardly by gravitational action along the length of the pad in a similar manner to that which occurs in conventional evaporative coolers with vertical pads.

Water can be supplied to each pad 6a, 6b through a separate trough extending along the upper edge of the pad in substantially conventional fashion, or alternatively a single trough can be associated with each pair of adjacent pads in the zone at which the upper edges of the two adjacent pads meet.

It will be seen in the configuration of FIG. 4, that the pads consist of alternating shorter pads (those designated 6a) and longer pads (those designated 6b) whereby when the cooler is installed, each pad will be inclined at approximately the same angle to the vertical as will be apparent from FIG. 4. Most pitched roofs in modem housing construction have a pitch angle within the range of approximately 22° to 30°. In one practical form of the invention the pads 6a, 6b are configured to have the same angle of inclination to the vertical (approximately 13°) when installed within a roof having a pitch angle of 26°. This configuration will suit the standard range of pitch angles just mentioned and although this will mean that in installations where the pitch angle is other than a 26° pitch angle, the two sets of pads will not have the same angle of inclination to the vertical, this is of no consequence to the functioning of the cooler as both sets of pads will still have an inclination to the vertical sufficient to allow the flow of water downwardly through the pads from the troughs at the upper edges of the pads.

It will be appreciated that with this angular array of pads in the zone where one pad meets an adjacent pad at its upper or lower edge, a seal does need to be formed so that incoming air does not bypass the pads at that zone. If the adjacent pads are in direct edge to edge contact, the edge portions can be chamfered to ensure contact over a sufficient height to provide an effective seal, rather than achieving substantially just a line contact. Alternatively a sealing strip or other form of seal structure can be incorporated between the adjacent pads in the zone where they meet.

With an evaporative cooler of the form shown in FIG. 1 and FIG. 4 in which the evaporative pads are not arranged vertically it is likely that, in use, some water will drip from the undersurface of the evaporative pads into the interior of the main housing 2. Although some of this dripping water is likely to fall directly to the bottom of the housing for collection and re-use, nevertheless it is likely that under the high rate of induced air flow through the housing, some of the water droplets may be entrained within the air flow and may be carried out by the air flow into the ducting in which case it is likely that at least some of those entrained water droplets will settle out from the air flow into the ducting perhaps forming small pools of water within the ducting or may even be retained within the air flow discharged into a space being cooled. To avoid this phenomenon, the cooler advantageously incorporates a device positioned in the path of the air flow exiting the housing to remove water droplets which may be suspended in the air flow. In one form as shown, this device comprises an array 50 of spaced vanes through which the cooled exiting air flow will pass, the slight inclination of the vanes causing diversion of the air flow direction at least to an extent sufficient to cause the major amount of suspended water droplets to settle out onto the surface of the vanes during passage therethrough, with the water dripping from these vanes onto the bottom wall of the housing 2 for collection. Alternatively, the device can comprise a pad of the same type as that used for the evaporative pads so that as the exiting cooled air passes through that pad it will act rather in the manner of a filter to collect water droplets which might be suspended within the air flow. Depending on the humidity of the cooled air, water collected on this pad might itself be evaporated and absorbed into the air flow, but if not, it will flow downwardly along the pad to be collected on the bottom wall of the housing. As shown, the array 50 of vanes (or alternatively the pad) is positioned adjacent the end wall 12 of the housing 2, although other positioning which provides the same effect could be provided.

The detailed housing structure just described including rain water diverter 40 and droplet removal device is equally applicable to the embodiment described with reference to FIGS. 1 to 3 in which the evaporative pads lie in a planar array substantially parallel to the plane of the roof.

Figure 5:
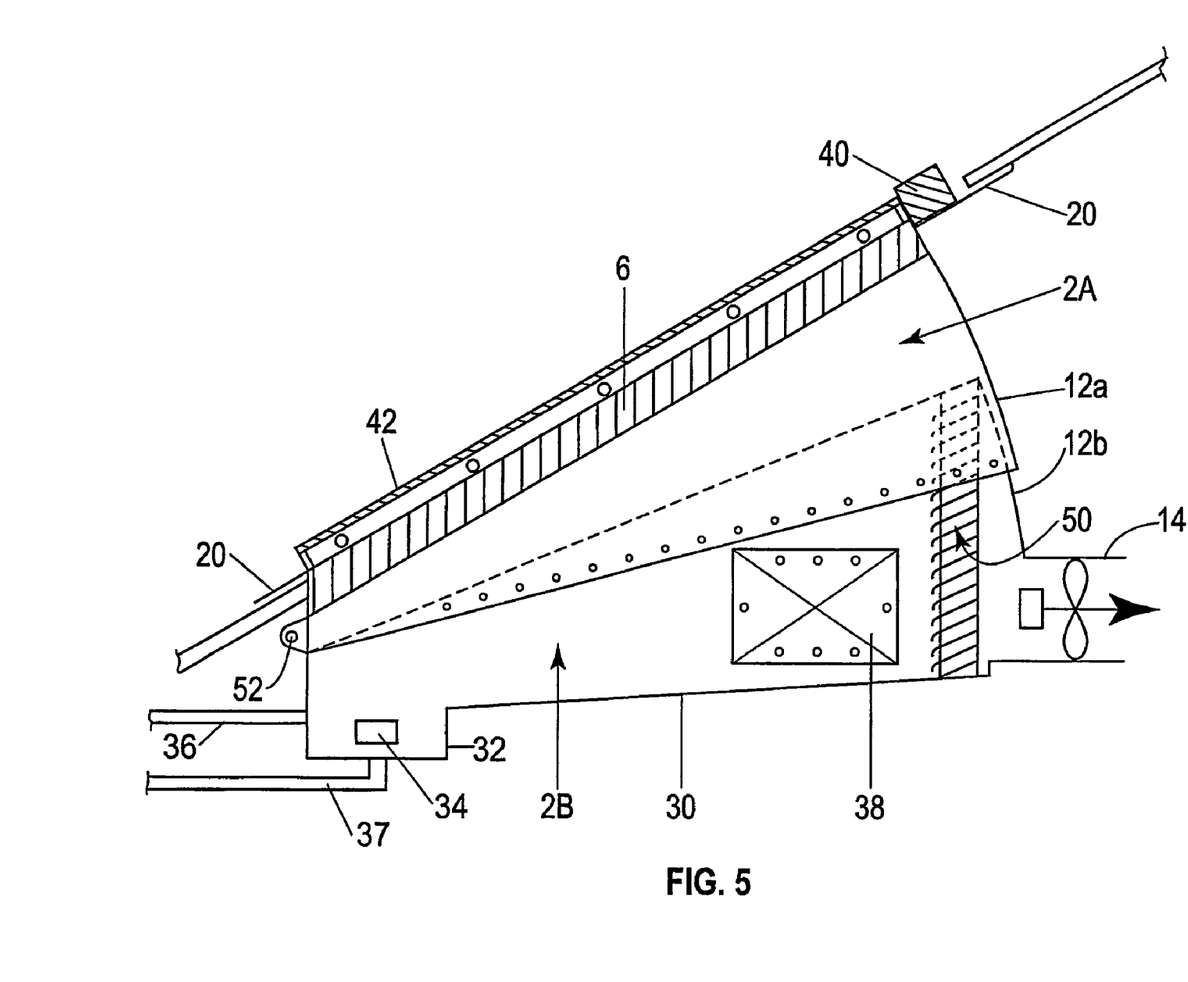

FIG. 5 shows a cooler of the general type shown in FIG. 4, but in which an upper part 2A of the housing which carries the pads 6, water feed system, flashing 20, rain water diverter 40 and safety grid 42 is pivoted to a lower part 2B of the housing including the sump 32, inspection opening 38 and fan housing 14. The pivotal connection is provided by a horizontal pivot 52 adjacent the forward wall of the housing so that the upper part 2A of the housing can be swung into an inclination to suit the particular pitch of the roof into which the cooler is being installed. This is of particular benefit when the cooler is being installed within a roof having a pitch outside of the normal range previously discussed. The walls of the housing parts 2A and 2B are in overlapping relation throughout the range of pivotal movement. The rear end walls 12a, 12b of the pivotal upper housing part 2A and of the lower housing part 2B are of arcuate form of a radius centred about the axis of pivot 52 to facilitate close contact between these wall parts throughout the range of pivotal movement of the upper housing part 2A. When the upper housing part 2A has been adjusted to the correct angle for installation it is secured in position relative to the lower housing part 2B by screws extending through the overlapping side and end walls of the two housing parts and also the joint between the overlapping walls is preferably sealed with a suitable sealant to ensure that that air is not drawn into the housing between the upper and lower housing parts. Although FIG. 5 shows the evaporative pads 6 arranged in a substantially planar array within or substantially parallel to the plane of the roof, the pads may be arranged in an angular array as described in relation to FIG. 4.

Figure 6:
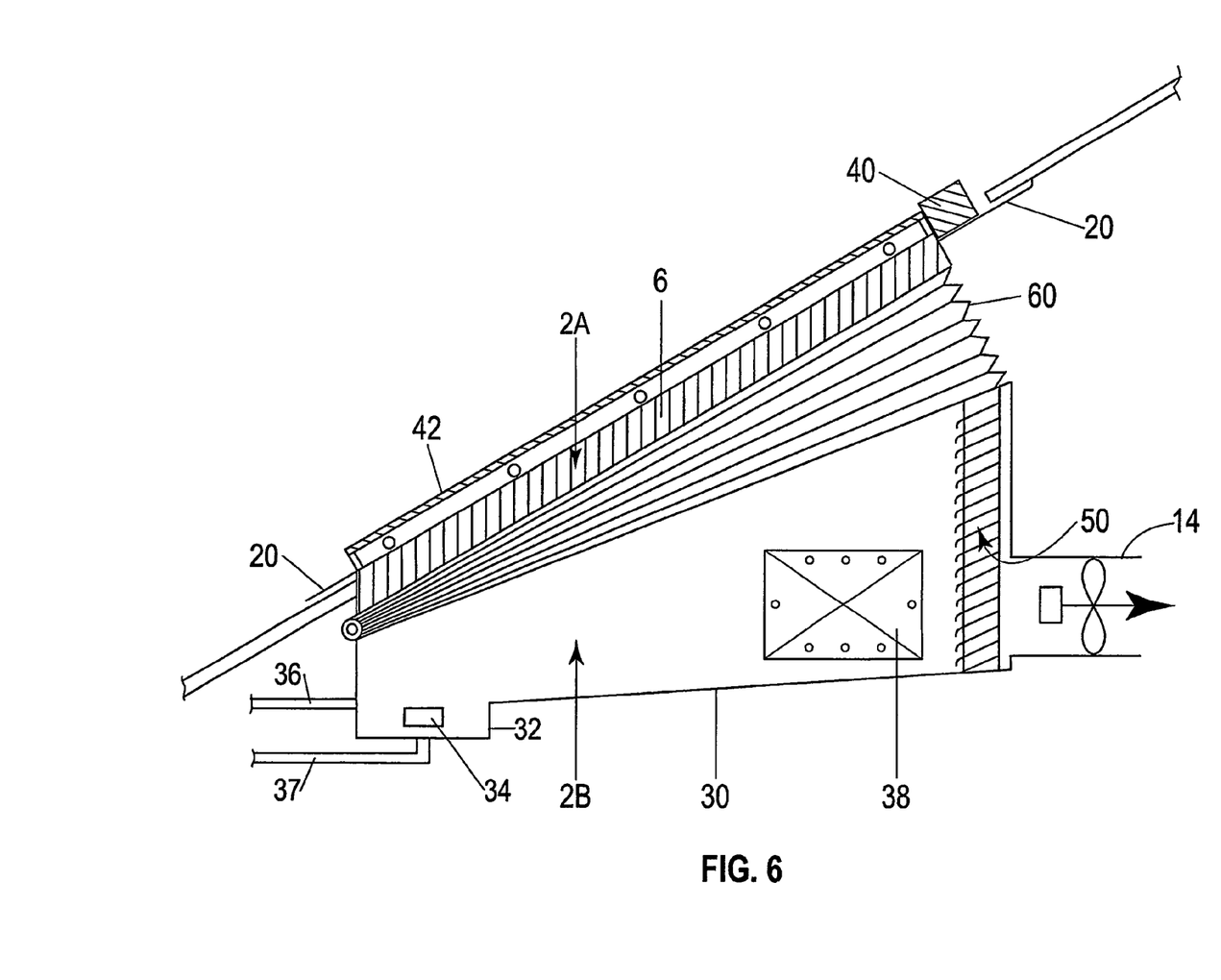

FIG. 6 shows an alternative form of housing which facilitates adjustment for the pitch angle of the roof in which the upper housing part 2B carrying the pads 6, flashing 20, water distribution system, safety grid 42, and rain water diverter 40 is connected to the lower housing 2A part by flexible sheet material 60 such as sheet plastic. In the configuration shown, the flexible sheet material is of concertina form although that is not essential and the sheet material can simply be a robust flexible plastics sheet capable of accommodating the required positioning of the upper housing part 2A, with the sheet being folded to absorb any excess sheet material arising when installed. Although there will not in this case be a rigid connection between the upper and lower housing parts 2A, 2B, each housing part will be individually fixed to the roofing structure on installation and therefore no relative movement will occur between these parts when installed. The planar array of pads 6 shown in FIG. 6 may be replaced by an angular array such as shown in FIG. 4.

The embodiments of FIGS. 4 to 6 are installed between adjacent rafters of the roof structure in the manner previously described in relation to FIG. 1.

Although in the embodiments shown in FIGS. 1, 5 and 6 using a planar array of pads, the pads are positioned substantially in the plane of the roof or in proximity thereto, with the water being supplied to the pads by sprays and/or drip emitters directed onto the external surface of the pads, it may be desirable for the planar array to be mounted within the inlet portion of the housing below the roof line by an extent sufficient to ensure the spray/drip emitters are more shielded from the effects of external wind.

With the constructions described, the array of evaporative pads lies substantially within the plane of the pitched roof or closely adjacent thereto. Although the array of pads is able to receive substantially unrestricted air flow from outside of the roof space and which is necessary for effective operation, the unsightly projection of conventional coolers is avoided; the presence of the cooler may not even be perceptible from the ground. The fan itself is incorporated in the part of the housing within the roof space; although some fan noise will inevitably still exist, nevertheless the external noise levels should be substantially diminished in relation to conventional externally mounted coolers. Also, the externally mounted housings of conventional externally mounted coolers when formed from plastics material are subject to degradation arising from UV exposure and this does, in time, result in maintenance problems. In the preferred embodiments of the present invention, the plastics housing of the cooler is not exposed.

Conventional evaporative coolers have to be installed after completion of the building or at least after completion of the roof structure. The cooler in accordance with the preferred embodiment of the invention can be installed from inside of the building prior to application of the roofing material and prior to installation of the ceiling and insulating material. Accordingly, the installation can be effected without the need to fit safety railing on the roof line thereby reducing labour costs. The incorporation of the integral flashing around the housing also facilitates a substantial cost saving in installation.

The embodiments has been described by way of example only and modifications are possible within the scope of the invention.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

The invention claimed is:

1. An evaporative cooler having a housing adapted to be installed within a roof space of a pitched roof, said housing having an air inlet which is inclined in such a manner as to extend substantially parallel to a pitched plane of the pitched roof when installed, at least two evaporative pads mounted in the housing and defining an air-permeable cooling means associated with the inlet, means for supplying water to the at least two pads, and a fan for drawing external air into the housing via the air-permeable cooling means and for discharging the air thereby cooled via an outlet of the housing, wherein the housing is so configured that when installed within the roof space the inclined air inlet is closely adjacent the external surface of the pitched roof and wherein the at least two pads defining the air-permeable cooling means are arranged within the housing beneath the inlet in an angular array, one inclined relative to another, to define a zig-zag configuration.

2. An evaporative cooler according to claim 1 wherein the housing is configured so that the inlet is inclined in such a manner as to extend substantially parallel to the pitched plane with the inlet lying closely adjacent to the external surface of the roof to avoid any substantial projection of the housing beyond the external surface of the roof, and the air-permeable cooling means is mounted within the housing so as to be positioned substantially wholly beneath the level of the external surface of the roof.

3. An evaporative cooler according to claim 1 wherein the housing is so configured that when the unit is installed there is no substantial projection of the air-permeable cooling means beyond the external surface of the pitched roof.

4. An evaporative cooler according to claim 1, wherein the air-permeable cooling means formed by the at least two pads is substantially planar in form and is mounted within the housing in an inclined configuration so as to lie substantially parallel to the inlet.

5. An evaporative cooler according to claim 4, wherein the water supply means includes spray and/or drip emitters configured to discharge water onto an upper outwardly-facing surface of the at least two pads defining the air-permeable cooling means.

6. An evaporative cooler according to claim 1, wherein the inclination of the individual pads within the zig-zag configuration is such that water supplied by the water supply means to an upper edge of each pad will flow downwardly through the pad in a length direction thereof.

7. An evaporative cooler according to claim 1, wherein the means for supplying water to the air-permeable cooling means comprises a reservoir at a base of the housing, and the base of the housing is so configured that surplus water discharged from the at least two pads into an interior of the housing is directed into the reservoir for re-use.

8. An evaporative cooler according to claim 1, wherein the housing has an inclined outer wall in which the inlet is formed, the outer wall including flashing for cooperation with the roof.

9. An evaporative cooler according to claim 8, wherein the flashing is integrally formed with the housing.

10. An evaporative cooler according to claim 8, wherein the flashing includes a rain water diverter for diverting water flowing down the roof from above the cooler to substantially prevent such flowing water from flowing into an interior of the housing via the air-permeable cooling means.

11. An evaporative cooler according to claim 1, having within an interior of the housing, means for removing water droplets which may be entrained within a flow path of the cooled air.

12. An evaporative cooler according to claim 11, wherein the droplet removal means comprises an array of vanes positioned within the flow path of the cooled air.

13. An evaporative cooler according to claim 11, wherein the droplet removal means comprises an air-permeable pad positioned within the flow path of the cooled air.

14. An evaporative cooler according to claim 1, wherein the air-permeable cooling means is mounted to an upper part of the housing including the inlet, said upper housing part being movable prior to installation of the cooler relative to a lower housing part which includes the outlet, the movement between the upper housing part and lower housing part enabling the housing to be adjusted to suit a pitch of the roof into which the cooler is being installed.

15. An evaporative cooler according to claim 14, wherein the upper housing part is pivotally attached to the lower housing part to enable the upper housing part to be swung relative to the lower housing part to adjust an angle of inclination of the upper housing part to suit the pitch of the roof.

16. An evaporative cooler according to claim 15, wherein the upper and lower housing parts have walls which lie in overlapping relationship throughout a range of movement of the upper housing part relative to the lower housing part.

17. An evaporative cooler according to claim 15, wherein the upper housing part is sealed relative to the lower housing part by a flexible sheet material which permits the relative movement between the housing parts.

18. An evaporative cooler according to claim 17, wherein the flexible sheet material is of concertina like form.

19. An evaporative cooler according to claim 1, wherein the housing carries above the air-permeable cooling means a structure to prevent a person on the roof from stepping onto the air-permeable cooling means and falling into the interior of the housing.

20. An evaporative cooler installation comprising:
a cooler housing having a housing inlet and configured to be mounted within a roof space of a pitched roof; and
at least two evaporative cooling pads associated with the housing inlet, wherein
the housing inlet is inclined to lie substantially parallel to a pitched plane of the pitched roof in close proximity thereto when the evaporative cooler installation is installed within the roof space of the pitched roof; and
the pads are arranged within the housing in an angular array, one inclined relative to another, to define a zig-zag configuration.

21. An evaporative cooler installation according to claim 20 wherein the cooler housing is mounted substantially wholly within the roof space of the pitched roof with the housing inlet for entry of external air being inclined so as to lie substantially in the pitched plane of the pitched roof, the at least two evaporative cooling pads being mounted within the housing substantially wholly beneath the pitched plane of the pitched roof such that external air flow is drawn into an interior of the cooler housing via the housing inlet and the at least two evaporative cooling pads for discharge from an outlet of the cooler housing.

22. An evaporative cooler installation according to claim 20 wherein the cooler housing is configured to be mounted between rafters of the pitched roof, said cooler housing carrying a fan for drawing external air into the cooler housing via at least two evaporative pads defining an air-permeable cooling means and for discharging the air thereby cooled via an outlet from the cooler housing, and said cooler housing also carrying a water reservoir and a pump for feeding water from the reservoir to the at least two evaporative pads and forming means for supplying water to the at least two evaporative pads, wherein the cooler housing mounts the air-permeable cooling means such that there is substantially no projection of the air-permeable cooling means beyond an external surface of the pitched roof.

23. An evaporative cooler installation according to claim 20, further comprising:
means for supplying water to each pad wherein the inclination of the individual pads within the zig-zag configuration is such that water supplied by the water supply means to an upper edge of each pad will flow downwardly through the pad in a length direction thereof.

24. An evaporative cooler installation according to claim 20 having an air-permeable pad within the interior of the housing downstream of the cooling pads to remove water droplets which may be entrained within a flow path of the cooled air.

25. An evaporative cooler installation according to claim 20 wherein the cooler housing is mounted substantially wholly within the roof space.

26. An evaporative cooler installation according to claim 25 wherein the cooler housing includes opposed substantially parallel side walls, the side walls and inclined air inlet being positioned toward an upper side of the cooler housing, said inlet being rectangular, the at least two evaporative cooling pads being mounted between the side walls adjacent the inlet to cool air drawn into the housing via the inlet for discharge of cooled air from an outlet of the housing.

27. An evaporative cooler comprising:
a housing adapted to be installed within a roof space of a pitched roof, said housing having an air inlet associated with at least two evaporative pads defining an air-permeable cooling means;
means for supplying water to each pad; and
a fan for drawing external air into the housing via the air-permeable cooling means and for discharging the air thereby cooled via an outlet from the housing, wherein
the housing is configured so that the inlet is inclined in such a manner as to extend substantially parallel to a plane of the pitched roof with the inlet lying closely adjacent to an external surface of the roof to avoid any substantial projection of the housing beyond the external surface of the roof;

the air-permeable cooling means is mounted within the housing so as to be positioned substantially wholly beneath the level of the external surface of the roof; and the cooling pads define an air-permeable cooling means arranged within the housing beneath the inlet in an angular array, one inclined relative to another, to define a zig-zag configuration.

28. An evaporative cooler according to claim 27, further comprising means for supplying water to each pad, wherein the inclination of the individual pads within the zig-zag configuration is such that water supplied by the water supply means to an upper edge of each pad will flow downwardly through the pad in a length direction thereof.

29. An evaporative cooler according to claim 27, having within an interior of the housing, means for removing water droplets which may be entrained within a flow path of cooled air.

30. An evaporative cooler comprising:

a housing adapted to be installed within a roof space of a pitched roof, said housing having an air inlet which is inclined in such a manner as to extend substantially parallel to a pitched plane of the pitched roof when installed;

at least one evaporative pad mounted in the housing and defining an air-permeable cooling means associated with the inlet;

means for supplying water to the at least two pads; and a fan for drawing external air into the housing via the air-permeable cooling means and for discharging the air thereby cooled via an outlet of the housing, wherein the housing is so configured that when installed within the roof space the inclined air inlet is closely adjacent the external surface of the pitched roof;

the air-permeable cooling means is mounted to an upper part of the housing including the inlet, said upper housing part being movable prior to installation of the cooler relative to a lower housing part which includes the outlet, the movement between the upper housing part and lower housing part enabling the housing to be adjusted to suit a pitch of the roof into which the cooler is being installed;

the upper housing part is pivotally attached to the lower housing part to enable the upper housing part to be swung relative to the lower housing part to adjust an angle of inclination of the upper housing part to suit the pitch of the roof; and the upper housing part is sealed relative to the lower housing part by a flexible sheet material which permits the relative movement between the upper and lower housing parts.

31. An evaporative cooler according to claim 30 wherein the flexible sheet material is of concertina like form.

* * * * *